United States Patent [19]

Keefer

[11] Patent Number: 4,888,459
[45] Date of Patent: Dec. 19, 1989

[54] MICROWAVE CONTAINER WITH DIELECTRIC STRUCTURE OF VARYING PROPERTIES AND METHOD OF USING SAME

[75] Inventor: Richard M. Keefer, Peterborough, Canada

[73] Assignee: Alcan International Limited, Montreal, Canada

[21] Appl. No.: 943,563

[22] Filed: Dec. 18, 1986

[51] Int. Cl.⁴ .............................................. H05B 6/80
[52] U.S. Cl. ...................... 219/10.55 E; 219/10.55 F; 426/101; 426/234; 426/243; 126/390; 99/DIG. 14
[58] Field of Search ................... 219/10.55 E, 10.55 F, 219/10.55 M; 99/DIG. 14, 451; 426/241, 243, 107, 234; 126/390

[56] References Cited

U.S. PATENT DOCUMENTS

| | | | |
|---|---|---|---|
| 3,835,281 | 9/1974 | Mannix | 426/107 X |
| 3,934,106 | 1/1976 | MacMaster et al. | 219/10.55 E |
| 3,985,992 | 10/1976 | Goltsos | 219/10.55 E |
| 4,081,646 | 3/1978 | Goltsos | 219/10.55 E |
| 4,230,924 | 10/1980 | Brastad et al. | 219/10.55 E |
| 4,266,108 | 5/1981 | Anderson et al. | 219/10.55 E |
| 4,337,116 | 6/1982 | Foster et al. | 426/114 X |
| 4,369,346 | 1/1983 | Hart et al. | 219/10.55 E |

Primary Examiner—Philip H. Leung
Attorney, Agent, or Firm—Cooper & Dunham

[57] ABSTRACT

A container for holding a body of material such as foodstuff to be heated in a microwave oven, including a dielectric lid and/or other dielectric wall structure with at least two ontiguous dielectric wall portions of respectively different electrical thickness for cooperatively modifying the microwave electric field patterns that would obtain in the body during such heating if the lid and/or other dielectric wall structure were of uniform electrical thickness or were absent. At least one of the portions, preferably the portion of higher electrical thickness, may be so constituted as to undergo a change in dielectric constant during the microwave heating, thereby to alter the heating distribution in the body as heating proceeds.

18 Claims, 5 Drawing Sheets

MICROWAVE CONTAINER WITH DIELECTRIC STRUCTURE OF VARYING PROPERTIES AND METHOD OF USING SAME

BACKGROUND OF THE INVENTION

This present invention relates to cooking containers which can be used in microwave ovens, and to methods of manufacturing such containers. More particularly, the present invention relates to a container which provides improved microwave heating distributions when used in a microwave oven.

The invention will be particularly described with reference to the microwave cooking of foodstuffs, but it is to be understood that the invention in its broader aspect embraces the provision of containers (and methods of using them) for the microwave heating of bodies of any microwave-heatable material.

In applicant's copending U.S. patent application Ser. No. 878,171, filed June 25, 1986, and entitled "Microwave Container and Method of Making Same," now abandoned the disclosure of which is incorporated herein by this reference, there is described a container for containing a material to be heated in a microwave oven, this container comprising an open topped tray for carrying the material and a lid covering the tray to form a closed cavity, the container being characterized in that at least one surface of the container is formed with microwave generating means for generating a mode of a higher order than that of the fundamental modes of the container, the microwave generating means being so dimensioned and positioned with respect to the material when in the container that the mode so generated propagates into the material to thereby locally heat the material. As will be understood, in a container holding a food article being heated in a microwave oven, multiple reflections of radiation within the container or food article give rise to microwave field patterns which can be described as modes. It will also be understood that the term "generating" as used herein embraces both enhancement of modes already existing in the container and superimposition, on existing modes, of modes not otherwise existing in the container.

In a multi-compartment container, such as is used for heating several different foodstuffs simultaneously, the term "container" as used herein should be interpreted as meaning an individual compartment of that container. If, as is commonly the case, a single lid covers all compartments, then "lid" as used above means that portion of the lid which covers the compartment in question.

The container may be made primarily from metallic material, such as aluminum, or primarily from non-metallic material such as one of the various dielectric plastic or paperboard materials currently being used to fabricate microwave containers, or a combination of both.

In a conventional microwave oven, microwave energy, commonly at a frequency of 2.45 GHz, enters the oven cavity and sets up a standing wave pattern in the cavity, this pattern being at fundamental modes dictated by the size and shape of the walls of the oven cavity. In an ideal cavity, only fundamental modes exist, but in practice due to irregularities in the shape of the oven walls, higher order modes are also generated within the cavity and are superimposed on the fundamental modes. Generally speaking, these higher order modes are very weak, and in order to promote better distribution of energy within the container, a "mode stirrer" can be used to deliberately generate or enhance the higher order modes.

If a container, such as a food container, is placed in the microwave oven, and microwave energy is caused to propagate into the interior of that container, then a similar situation exists within the container as exists within the oven itself: a standing wave pattern is set up within the container, this pattern being primarily in the fundamental modes of the container (as distinct from the fundamental modes of the larger oven cavity), but also containing modes higher than those of the fundamental modes of the container, which higher modes are, for example, generated by irregularities in the interior shape of the container and its contents. As before, these higher order modes are generally of much lower power than the fundamental modes and contribute little to the heating of the material within the container.

Attention will now be directed to the manner in which the material within the container is heated by the microwave energy existing within the container. In doing this, it is convenient to study only horizontal planes within the container. It is well known that the standing wave pattern within the container consists of a combined electric and magnetic field. However, the heating effect is obtained only from the electric field and it is therefore of significance to examine the power distribution of the electric field as it exists under steady-state conditions within the container. In the fundamental modes—which, it should be recalled, are those predominantly existing within the container—the pattern of power distribution in the horizontal plane is confined to the edge of the container and this translates into a heating effect which is likewise concentrated around the edge of the container. The material in the central part of the container receives the least energy and therefore, during heating, its center tends to be cool. In conventional containers, this problem of uneven heating is ameliorated by instructing the user to leave the material unattended for a few minutes after the normal microwave cooking time in order for normal thermal conduction within the food to redistribute the heat evenly. Alternatively, the material may be stirred, if it is of a type which is susceptible to such treatment.

The shape of these "cold" areas varies according to the shape of the container. For example, for a rectangular container the shape of the cold area in the horizontal plane is roughly rectangular with rounded corners; for a container which is circular in horizontal cross section, the cold area will be likewise circular and positioned at the center of the container. For an irregularly shaped container, such as is commonly found in compartments of a multi-compartment container, the "cold" area will roughly correspond to the outside contour of the container shape and will be disposed centrally in the container.

In considering the heating effect of higher modes which may or may not exist within the container, it is necessary to notionally subdivide the container into cells, the number and arrangement of these cells depending upon the particular higher order mode under consideration. Each of these cells behaves, from the point of view of microwave power distribution, as if it were itself a container and therefore exhibits a power distribution which is high around the edges of the cell, but low in the center. Because of the physically small size of these cells, heat exchange between adjacent cells during cooking is improved and more even heating of the material results. However, in the normal container, i.e. unmodified by the structures described in the aforementioned copending application, these higher order modes are either not present at all or, if they are present, are not of sufficient strength to effectively heat the central regions of the food. Thus the primary heating effect is due to the fundamental modes of the container—i.e., a central cold area results.

Recognizing these problems, what the structures described in the aforementioned copending application seek to do, in essence, is to heat this cold area by introducing heating energy into the cold area. This can be achieved in two ways:

(1) by redistributing the microwave field pattern within the container by enhancing higher order modes which naturally exist anyway within the container due to the boundary conditions set by the physical geometry of the container, but not at an energy level sufficient to have a substantial heating effect or, where such naturally higher order modes do not exist at all (due to the geometry of the container), to generate such natural modes.

(2) to superimpose or "force" onto the normal field pattern—which, as has been said, is primarily in the fundamental modes—a further higher order field pattern whose characteristics owe nothing to the geometry of the container and whose energy is directed towards the geometric center of the container in the horizontal plane which is the area where the heating needs to be enhanced.

In both the above cases, the net result is the same: the container can be notionally considered as having been split into several smaller areas each of which has a heating pattern similar to that of the fundamental modes, as described above. However, because the areas are now physically smaller, normal thermal convection currents within the food have sufficient time, during the relatively short microwave cooking period, to evenly redistribute the heat and thus avoid cold areas. In practice, under certain conditions higher order mode heating may take place due to both of the above mechanisms simultaneously.

The process for generating the microwave field, as described in the aformentioned copending application, may take one of two forms:

(1) Where said at least one surface of the container takes the form of a sheet of microwave transparent material, a plate of electrically conductive material which is attached to or forms part of the sheet. Such a plate could be made for example of aluminum foil which is adhered to the sheet, or could be formed as a layer of metallization applied to the sheet.

(2) Where said at least one surface of the container takes the form of a sheet of electrically conductive material, such as aluminum foil, an aperture in the sheet through which microwave energy incident on the sheet can pass. Preferably, the aperture is covered by microwave transparent material. In some instances, however, the aperture may simply be a void (i.e. open), for example to permit venting of steam from within the container.

It will be appreciated that the two alternatives listed above—i.e., the plate and the aperture—are analogues of one another. For ease of understanding, in the first alternative, the plate can be considered as a two-dimensional antenna, the characteristics of which follow from well-known antenna theory. Thus, the plate can be considered as receiving microwave energy from the oven cavity, whereupon a microwave field pattern is set up in the plate, the characteristics of which pattern are dictated by the size and shape of the plate. The plate then retransmits this energy into the interior of the container as a microwave field pattern. Because the dimensions of the plate are necessarily smaller than those of the container surface with which it is associated, the order of the mode so transmitted into the interior will be higher than the container fundamental modes.

In the second alternative, the aperture can be considered as a slot antenna, the characteristics of which again follow from theory. The slot antenna so formed effectively acts as a window for microwave energy from the oven cavity. The edges of the window define a particular set of boundary conditions which dictate the microwave field pattern which is formed at the aperture and transmitted into the interior of the container. Once again, because the dimensions of the aperture are smaller than those of the container surface with which it is associated, the shape and (particularly) the dimensions of the aperture are such as to generate a mode which is of a higher order than the container fundamental modes.

Several separate higher order mode generating means—be they plates or apertures—may be provided on each container to improve the heat distribution. The higher order mode generating means may all be provided on one surface of the container, or they may be distributed about the container on different surfaces. The exact configuration will depend upon the shape and normal (i.e., unmodified by the plates and/or apertures) heating characteristics, the object always being to get microwave energy into the cold areas, thus electrically subdividing the container down into physically smaller units which can more readily exchange heat by thermal conduction. The considerations which are to be given to the positioning of the higher order mode generating means will depend upon which of the two mechanisms of operation it is desired to use: if it is desired to enhance or generate a particular higher order mode which is natural to the container, then the above-mentioned cell pattern appropriate to that mode should be used to position the plates or apertures forming the higher order mode generating means. In order to enhance or generate a natural mode, a plate/aperture of approximately the same size as the cell will need to be placed over at least some of the cells—the larger the number of cells which have a plate or aperture associated with them, the better the particular mode chosen will be enhanced. In practice, a sufficient space must be left between individual plates/apertures in order to prevent field interaction between them—it is important that each plate/aperture is sufficiently far from its neighbor to be able to act independently. If the spacing is too close, the incident microwave field will simply see the plates/apertures as being continuous and, in these circumstances, the fundamental mode will predominate, which will give, once again, poor heat distribution. A typical minimum spacing between plates would be in the range of 6 to 12 mm, depending upon the particular container geometry and size. A typical minimum spacing between apertures (i.e. where the apertures are separated by regions of foil or other metallized layer) is in the range of 6 to 12 mm., both to protect the electrical integrity of the structure from mechanical damage such as scratches and to avoid ohmic overheating which is likely to result from high induced currents in narrower metal strips; a typical minimum width of metal border regions defining the outer peripheries of apertures would be in the same range, for the same reasons.

If, on the other hand, it is desired to use the mechanism of "forcing" an unnatural higher order mode into the container, then the plate/aperture forming the higher mode generating means needs to be placed over the cold area or areas within the container. In such circumstances, the plate/aperture, in effect, acts as a local heating means and does not (usually) significantly affect the natural modes of the container. Thus the "forced" mechanism utilizes the heating effect of the container fundamental superimposed onto its own heating effect. At certain critical sizes and positioning of the plates, both mechanisms—forced and natural—may come into play.

For convenience of explanation, the present discussion considers matters only in the horizontal plane and for the same reason, the only surfaces which are formed with the higher order generating means in the embodiments which follow are horizontal surfaces—i.e., the bottom of the container or the lid of the container. However, there is no reason why the teachings of the aforementioned copending application (and of the present invention) should not be applied to other than horizontal surfaces since the ambient microwave field in which the container is situated is substantially homogeneous.

Because the characteristics of the plate/aperture alternatives are analogous (indeed a particular aperture will transmit an identical mode to that transmitted by a plate of identical size and shape), it is possible to use them interchangeably—in other words, whether a plate or aperture of particular dimensions is used, can be dictated by considerations other than that of generating a particular microwave field pattern.

Clearly, the heating effect of the higher order mode generating means will be greatest in the food immediately adjacent to it and will decrease in the vertical direction. Thus, it may be an advantage to provide higher mode generating means both in the lid and in the bottom of the container. Since the cold areas will be in the same position in the horizontal plane whether the lid or the bottom of the container is being considered, it is clearly convenient to make the higher mode generating means in the lid in registry with those in the bottom of the container. By this means, better heat distribution in the vertical direction can be achieved. It matters not which particular type of higher mode generating means is used as between the lid and the bottom—in one embodiment, for example, a plate or plates are formed on the lid, while in-registry aperture or apertures are formed in the container bottom. In another embodiment, apertures are provided in both lid and bottom surfaces.

The aforementioned copending application also contemplates a method of manufacturing a container as described above for containing a material to be heated in a microwave oven, comprising forming, on at least one surface of the container, microwave generating means for generating a mode of a higher order than that of the fundamental modes of the container, such generating means being so dimensioned and positioned with respect to the material when in the container that the mode so generated propagates into the material to thereby locally heat the material. Each higher order mode generating means may be so configured and positioned on its surface as to generate or amplify higher order modes which are natural to the container and dictated by its boundary conditions, and/or to generate a mode which is of higher order than that of the fundamental of the container but is not otherwise dictated by the boundary conditions of the container and would not normally exist therein.

SUMMARY OF THE INVENTION

The present invention, in a first aspect, broadly contemplates the provision of a container for holding a body of material to be heated in a microwave oven, including a dielectric wall structure comprising at least two contiguous dielectric wall portions of respectively different electrical thickness for cooperatively modifying the microwave electric field pattern that would obtain in the body during such heating if the wall structure were of uniform electrical thickness or were absent.

In one more particular sense, the present invention, in common with that described in the aforementioned copending application, contemplates the provision of a container for containing a material to be heated in a microwave oven, this container comprising an open-topped tray for carrying the material and a lid covering the tray to form a closed cavity, the container being characterized in that at least one extended surface of the container is formed with means for modifying the microwave electric field pattern in the container by generating a mode of a higher order than that of the fundamental modes of the container, the modifying means being so dimensioned and positioned with respect to the material when in the container that the mode so generated propagates into the material thereby to locally heat the material. In accordance with the present invention, however, the modifying means comprises at least a first dielectric wall portion of the container defining a first region of the extended surface and a second dielectric wall portion of the container defining a second region of the extended surface contiguously surrounding the first region, one of these two wall portions having an electrical thickness substantially greater than that of the other.

That is to say, whereas the structures specifically described in the aforementioned copending application utilize surface-defining combinations of electrically conductive (e.g., metal plate or sheet) regions and dielectric (microwave-transparent) regions to constitute the higher order mode generating means, the present invention embraces the discovery that useful field-modifying or mode-generating effects can be achieved with a dielectric (i.e., electrically nonconducting) wall structure by providing appropriately arranged and configured adjacent or contiguous dielectric portions thereof that differ from each other in electrical thickness. For example, referring to those embodiments of structure described in the aforementioned copending application wherein the extended surface is a sheet of microwave-transparent dielectric material having a conductive metal plate disposed thereon, comparable field-modifying effects are attainable (in accordance with the present invention) by substituting for the metal plate a dielectric portion, in or on the sheet, having a greater electrical thickness than the surrounding portion of the sheet. Again, where in the copending application the higher order mode generating means is a metal sheet defining one or more apertures, in accordance with the present invention comparable effects are attainable by substituting for the metal sheet an "aperture"-defining dielectric wall portion of relatively high electrical thickness, with the "aperture(s)" constituted of dielectric wall portions of lower electrical thickness.

In each case, the dielectric wall structure of the invention serves (generally like the metal plate-dielectric sheet or metal aperture-defining sheet structures of the aforementioned copending application) to establish or generate, within the container, one or more modes of a higher order than the container fundamental mode, so as to achieve a beneficially modified heating distribution in the body of material being heated, as desired (for example) to provide enhanced uniformity of heating throughout the body, or to effect localized intensification of heating in or on selected portions of the body, as for browning or crispening. Thus, the present invention affords a new way of overcoming the heat-distribution problems and limitations of conventional microwave heating, wherein significant heating is produced predominantly or exclusively by microwave energy in the fundamental mode(s) of the container holding the body. Indeed, in at least some instances, the mode-generating, heat-distribution-modifying effects of the present invention may be superior to those afforded by the structures of the aforementioned copending application.

The "electrical thickness" of a dielectric wall structure is a function of the actual spatial thickness of the wall (measured, in conventional units of length, between opposed surfaces thereof) and the dielectric constant of the wall material. Stated with reference to microwave energy of a given frequency, having a free-space wavelength $W_o$, and a wavelength $W_m$ in the dielectric wall material, for a wall having an actual spatial thickness d equal to $n_o$ times the wavelength $W_o$ (d being, of course, also equal to $n_m$ times the wavelength $W_m$, i.e., $d = n_o W_o = n_m W_m$) the electrical thickness D may be defined as that spatial distance equal to the number $n_m$ of free space wavelengths $W_o$, which number $n_m = d/W_m$. Consequently, $$D = n_m W_o = d(W_o/W_m) = d(k_m/k_o)^{\frac{1}{2}},$$

since $W_o/W_m$ is equal to the square root of the ratio of the dielectric constant $k_m$ of the wall material to the free space dielectric constant $k_o$. It will therefore be seen that the electrical thickness D of a dielectric wall portion increases with increasing spatial thickness d and/or increasing dielectric constant $k_m$ of the wall portion.

Preferably, in the structures of the invention, the dielectric wall portion(s) of greater electrical thickness are constituted of material having a higher dielectric constant than the material of the dielectric wall portion(s) of lesser electrical thickness. The portion(s) of greater electrical thickness may also have a greater spatial thickness than the portion(s) of lesser electrical thickness, although this is by no means necessary in all cases. The term "dielectric" herein is to be understood broadly as embracing conventional dielectric (nonconductive) materials and also so-called artificial dielectrics, such as dispersions of metallic particles in a nonconductive matrix, which are characterized by a dielectric constant significantly higher than that of the matrix material alone.

As a further particular feature of the invention, in important embodiments thereof, one or more of the aforementioned dielectric wall portions may be so constituted as to undergo a change in dielectric constant when subjected to irradiation by microwave energy. Typically or preferably, in these embodiments the portion (or one or more of plural portions) of greater electrical thickness is made initially "lossy" (i.e., absorptive of, and thus directly heatable by, microwave energy), and is of such a nature that it exhibits a decrease in dielectric constant when heated, the decrease being either progressive or occurring upon attainment of some particular elevated temperature. Consequently, upon exposure to microwave energy in a microwave oven, the wall portion thus constituted heats up, and its dielectric constant drops either gradually or suddenly as it attains a predetermined elevated temperature, with the result that its electrical thickness (and the difference in electrical thickness between contiguous wall portions) decreases, reducing or terminating the effect of the dielectric wall structure on microwave electrical field patterns within the container and thereby altering the heat distribution within the body being heated.

In this way, desired changes in heat distribution during the course of heating or cooking may be achieved. For example, the initially modified heating distribution produced by the wall structure of the invention may be such as to cause locally intensified heating to effect browning or crispening, and this local intensification may then be shut off (by reduction in dielectric constant of the wall portion of greater electrical thickness) while overall heating continues. It will be appreciated that where the wall portion in question is lossy, its heating by microwave energy may be such that it serves as a supplemental source of heat (through radiation and/or conduction) for at least localized regions of the body being heated.

Illustratively, in such embodiments of the invention a dielectric wall portion of initially greater electrical thickness may be constituted of a porous or other material (e.g. a silica gel) having an initially high moisture (water) content, which enhances its dielectric constant; as heating proceeds, the water volatilizes, progressively reducing the dielectric constant. Some edible materials, e.g. pie crusts or layers of heterogeneous composition and/or varying thickness, may themselves be capable of functioning as dielectric wall structures in such a manner if appropriately configured. One specific embodiment of the invention, especially advantageous for use as frozen food packaging, incorporates a dielectric wall portion of hygroscopic material which takes up moisture when exposed to air at ambient temperatures so as to constitute a or the wall portion of greater electrical thickness, though it may be substantially dry while frozen.

Again, the material of the wall portion of greater electrical thickness may be a ferroelectric substance having a high ambient-temperature dielectric constant but undergoing a marked drop in dielectric constant when its Curie temperature is reached. For reasons of toxicity, some high-performance ferroelectric materials (e.g. titanates based on heavy metals) would not be favored for such use in cooking, though they are suitable for the heating of non-food materials, but other, lower-performance ferroelectrics (e.g. Rochelle salts) can be employed in cooking applications.

In currently preferred embodiments, the dielectric wall structure of the invention, incorporating contiguous wall portions of respectively greater and lesser electrical thickness, is the container lid, and may be associated with a container tray of any convenient or desired type, e.g. fabricated of metallic and/or dielectric material. In such case, the container bottom (for example) may have a higher-mode-generating metal plate or aperture structure as described in the aforementioned copending application, and may be designed to cooperate with the dielectric wall portions provided in the lid, in a manner analogous to the cooperation between a plate or aperture - type bottom and a plate or aperture - type lid described in that application. However, the dielectric wall structure of the invention may alternatively be provided as or in the container bottom, or as or in another wall of the container.

The contiguous portions of respectively greater and lesser electrical thickness, in the dielectric wall structure of the invention, may be sharply demarcated; i.e. there may be an abrupt discontinuity or stepwise variation in dielectric properties between them. For simplicity and clarity of description, the specific embodiments of the invention to be described will be shown as having such stepwise variation. On the other hand, in a broader sense it is also contemplated that the variation between the contiguous portions may be more or less smooth, gradual, and continuous, with respect to spatial thickness and/or dielectric constant.

The invention in a further aspect embraces the provision of a wall component for a container for holding a body of material to be heated in a microwave oven, such component comprising a dielectric wall structure having at least two contiguous dielectric wall portions of respectively greater and lesser electrical thickness cooperatively configured and arranged to modify microwave electric field patterns within the body. This component may be an independent element, such as a container lid or tray, or an effectively integral portion of a container also including other walls.

In still another aspect, the invention contemplates a method of heating a body of microwave-heatable material in a container of the type described, including the steps of placing the container holding such body in a microwave oven and irradiating the container and body with microwave energy therein. Where the container includes one or more dielectric wall portions that undergo change in dielectric constant during heating, the irradiating step in this method is continued until after such change occurs, for altering the heat distribution pattern in the body during heating.

Further features and advantages of the invention will be apparent from the detailed description hereinbelow set forth, together with the accompanying drawings.

BRIEF DESCRIPTION OF THE DRAWINGS

FIGS. 1–10B are identical to the correspondingly numbered figures of the aforementioned copending application, although as explained below, the showings of FIGS. 1–4 and 6–10B will also serve to illustrate embodiments of the present invention, depending on the materials used.

FIGS. 1–4 are diagrammatic plan views showing four different patterns of the lid or bottom surfaces of a microwave container constructed in accordance with the aforementioned application or the present invention;

FIG. 5 is a graph showing, in a container according to the aforementioned application in which the higher mode generating means comprises a metal plate in the lid surface, the variation of heating energy entering the container as the area of the plate with respect to that of the whole lid is varied;

FIG. 6 is an exploded perspective view of a container constructed in accordance with the aforementioned application or the present invention;

FIG. 7 is a view similar to that of FIG. 6, showing a multi-compartment container;

FIGS. 8 and 9 are further views similar to FIG. 6, showing further alternative embodiments;

FIGS. 10A and 10B are, respectively, diagrammatic plan views of the container bottom surface and top surface of a still further embodiment of the container of the aforementioned application or the present invention;

DETAILED DESCRIPTION

I. Disclosure of the Aforementioned Copending Application

For the sake of assured full understanding of the present invention, the detailed description set forth in the aforementioned copending application will first be substantially repeated, with reference to accompanying FIGS. 1–10B.

Figure 1:
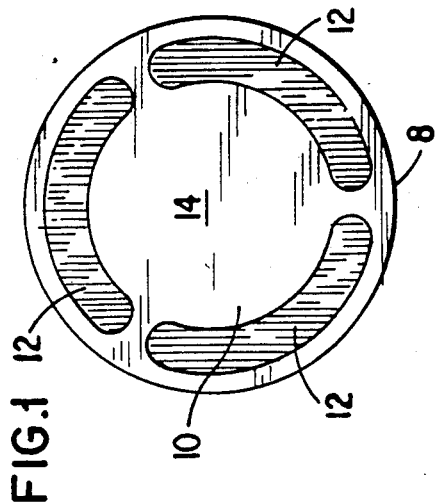

Referring to FIG. 1, the circular surface shown may comprise the bottom surface or the lid surface of circular cylindrical container 8. The surface, shown under reference 10, is made principally from microwave transparent material and is substantially planar (although this is not essential). The remainder of the container 8, which is not shown, may be of metal, such as aluminum foil, or one of the microwave transparent plastic, cellulosic and composite materials currently available. Attached to the surface are three similar segmental plates 12 of metal foil.

Each of the plates 12 acts as a source of a higher order mode wave pattern which propagates into the container and acts to generate a higher order mode harmonically related to the fundamental of the container and defined, in essence, by the boundary conditions of the cylindrical wall of the container. The area 14 bounded by the three plates 12 is of microwave transparent material and is thus a route by which microwave energy enters the container.

Figure 2:
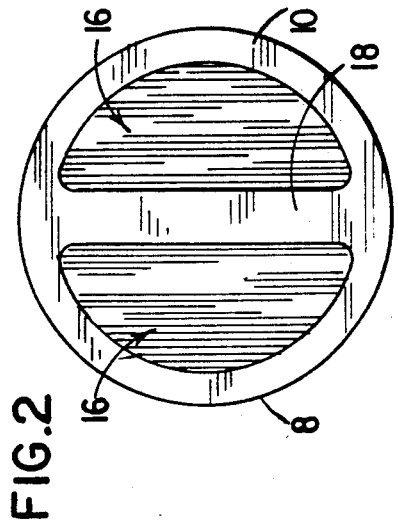

FIG. 2 is similar to FIG. 1, except that the plates, now shown under reference 16, are substantially semi-circular in plan view and are separated by a gap 18. This embodiment operates in the same way as the FIG. 1 embodiment in that it generates a higher order mode harmonically related to the fundamental of the container and defined by the boundary conditions of the container. The difference between FIGS. 1 and 2 is simply in the order of the particular higher order mode generated: in FIG. 1 a third order mode is being generated; in FIG. 2 a second order mode.

Figure 3:
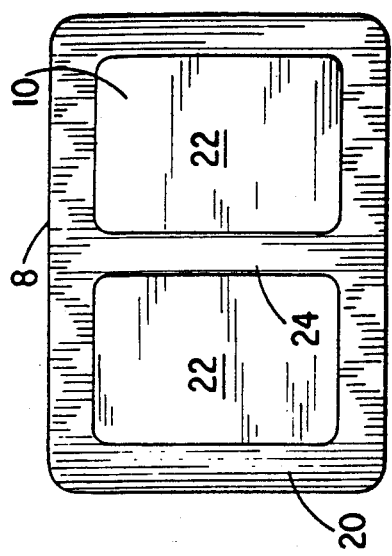
Figure 4:
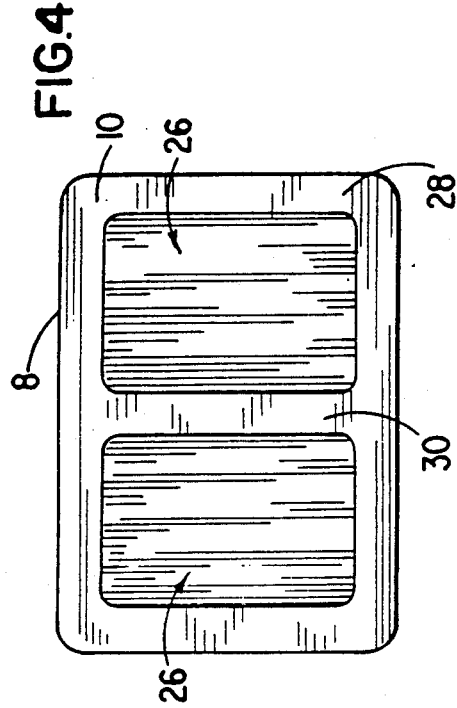

FIGS. 3 and 4 show a container bottom or lid surface 10 for a rectangular container 8. The two embodiments are the inverse of one another, but actually operate in an analogous manner. In FIG. 3, the surface 10 is made of conducting material such as metal in which are formed two rectangular apertures 22 covered with microwave transparent material. As explained above, each aperture 22 acts as a window, allowing through it microwave energy from the oven cavity. The shape and dimensions of the edge of the aperture create boundary conditions which establish a microwave field pattern which propagates into the container. The wave thus transmitted into the container is of a higher order than that of the container fundamental and acts to accentuate or amplify a higher (second) order mode—the $E_{12}$ or $E_{21}$ mode—which is almost certainly already present within the container but at a low power level. Once again, this mode is harmonically related to that of the container fundamental and is therefore essentially determined by the geometry of the container. The amplification of the second order mode effectively electrically splits the rectangular dish into two identical cells divided roughly by the dividing line 24 between the two apertures 22. Each of these cells can, as explained above, be considered as a notionally separate container operating in the fundamental mode. Thus, although a relatively cool area is found at the center of each of the notionally separate containers, because the containers are physically only half the size of the actual container, the problem of redistributing heat by thermal conduction from the hotter areas into the cooler areas, is greatly reduced.

In a structure as shown in FIG. 3, used as a lid, if modes entering are cut off through selection of appropriate aperture sizes, the spacing between lid and contained foodstuff can be selected advantageously to control the amount of power entering through the apertures.

It will be seen that generating still higher modes and thereby electrically subdividing the container into a larger number of smaller and smaller cells will result in this problem of conductive exchange of heat being still further reduced, but this process cannot be carried out to an unlimited extent. The reason for this is that the higher the mode order, the more quickly it attenuates after having left the aperture 22 from which it was generated. The same applies to retransmission from metal plates. Thus there comes a stage, particularly when an air gap exists between the food and the surface 10, where the microwave energy may not even reach the surface of the food, or may only just reach it. Thus it is important that the order of mode generated is sufficiently low not to be attenuated too rapidly within the food being heated; otherwise, the heating effect of the higher order mode will be negligible and the heating characteristics will be those of the container fundamental.

The lower the order of the mode—i.e. the nearer the fundamental—the less pronounced is the attenuation in the air gap (if any) between the surface 10 and the food and the less abrupt the absorption within the food. An abrupt absorption profile within the food will give a concentration of energy, and hence heating, near the food surface which in turn results in browning or crispening of the food.

Thus, unless there is a specific requirement for browning or crispening, the preferred higher order mode is that which is as low as possible consistent with giving an acceptable distribution of heating within the food. The exact value of the order which is decided on will also depend upon the physical size of the container in the horizontal plane—clearly large containers will have to be operated in higher modes in order to keep down the physical size of each heating cell. However it has been found that, under most circumstances, container modes between the first order and the fifth order (the fundamental being regarded as the zeroth order) will be used.

A further constraint on the dimensions of the plate or aperture which forms the higher order mode generating means is connected with the single dimensional resonance of the plate or aperture at the operating frequency of the oven (usually 2.45 GHz). Drawing on the above-mentioned analogy with two-dimensional antennae, it will be apparent that at a certain size the plate/aperture will resonate. As it happens, the expected size for resonance is affected by the fact that the antenna—i.e., the plate or aperture—does not exist in free space, but rather is affected by the nearby presence of lossy material—in particular the material (usually food) being heated. The presence of the food distorts the radiation pattern of the antenna and causes resonance to occur at dimensions different from those which would be predicted by free space calculations. It is necessary to keep the linear dimensions (length and width) away from those values causing resonance and submultiples of those values. The reason for this is that, at resonance, the antenna generates high field potentials which are capable of causing electrical breakdown and overheating in adjacent structures. Also, the antenna radiates strongly in the direction of the food, and can cause burning before the remainder of the food is properly cooked.

The resonance of concern in this regard is "one-dimensional" resonance, as exemplified by a plate, the longest dimension of which is close to one-half of the free-space wavelength of the microwave energy (or close to an integral multiple of that half wavelength value), and the shortest dimension of which is much smaller, e.g. (for a microwave frequency of 2.45 GHz) a plate about 6 cm. long and 1 cm. wide. Two-dimensional resonance creates no problem, because the field intensity is much more distributed. Also, even one-dimensional resonance is of less concern in the case of an aperture because the effects of such resonance are much less severe than in the case of a plate, but a very narrow aperture of half-wavelength long dimension should be avoided because of the likelihood of arcing near the aperture midpoint, where the field is most intense.

Turning now particularly to FIG. 4, the higher order mode generating means is now formed of a pair of plates 26. These act in the same way as the windows 22 of the FIG. 3 embodiment and will amplify the $E_{12}$ or $E_{21}$ mode already in the container.

The following are actual examples of test results carried out on circular and rectangular metal foil containers. In each instance, the plates comprised metal foils attached to thermoformed 7 mil polycarbonate lids. The test oven was a 700 watt Sanyo (trademark) microwave oven set at maximum power. A thermal imager was an ICSD model No. 320 thermal imaging system and video interface manufactured by ICSD (trademark) Corporation. The load to be heated was water saturated into a cellular foam material.

Using a 190 gram water load, without the cellular material, an unmodified 12.7 cm diameter foil container was tested. After 60 seconds an average temperature rise of 13° C. was observed. A 6 cm diameter foil disk was then centrally located on the lid and the test repeated. The temperature rise was determined to be 15.5° C. A 1.5 cm aperture was made in the 6 cm foil disk, approximating the configuration shown in FIG. 1, and a 17.5° C. temperature rise was observed.

Using the cellular foam material containing a 175.5 gram water load, the test container was heated for 40 seconds and its thermal images recorded. Heating was concentrated around the edge of the load with a temperature differential of about 10° C. between the edge and the center of the container. With a 6 cm foil disk on the cover as described above, the thermal images indicated heating both at the center and edge of the container, showing a better thermal distribution. With the 1.5 cm diameter aperture, a slightly more even thermal image was obtained for a 40 second test.

Tests using actual foodstuff showed that the disk and disk-aperture configuration browned the upper surface of the foodstuff.

A 17×12.7 cm rectangular foil container was then tested. A 390 gram water load was raised 10.5° C. in 60 seconds. Two transversely positioned foil rectangles were mounted on a cover, approximating FIG. 4. The following table shows the results:

| Rectangle size of ground planes | Temperature C.° |
|---|---|
| 10.5 × 6.8 cm | 11.5 |
| 9.5 × 6.3 | 13.5 |
| 8.5 × 5.3 | 13.5 |
| 7.5 × 4.3 | 13.0 |
| 6.5 × 3.3 | 12.0 |
| 5.5 × 2.3 | 12.0 |

Thermal imaging results for the smaller structures showed regions of most intense heating which appear to correspond in shape to the metal plates. The use of the dual rectangular shape of FIG. 4 clearly improves the uniformity of heating of the foodstuff. Once again, using an actual foodstuff the top surface of the foodstuff was browned.

Figure 5:
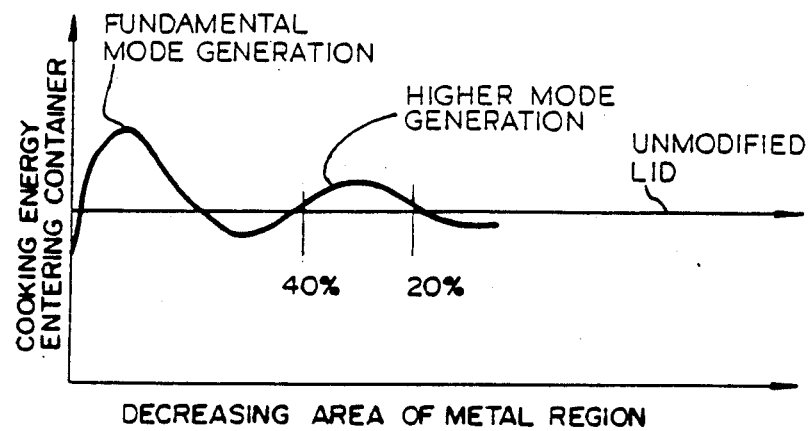
Figure 6:
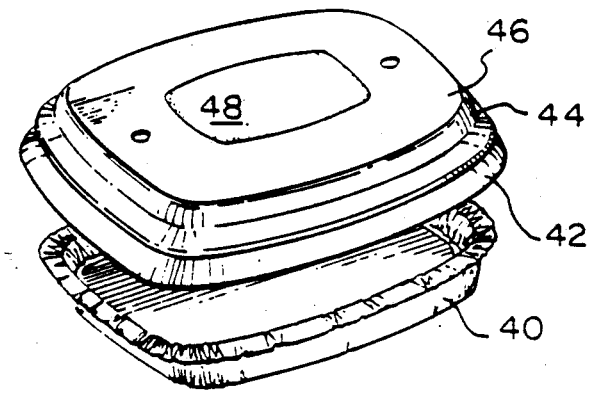

Reference will now be made to FIGS. 5 and 6 which relate to an embodiment in which the container comprises a generally rectangular metal foil tray 40 having a lid 42 of microwave transparent material located thereon. A skirt 44 elevates the top surface 46 of the lid above the top of the tray 40 and therefore above the top surface of the foodstuff contained within the container. A plate 48 of conducting material is centrally located on the top surface 46 of the lid 42. The plate 48 has a shape approximately corresponding to the shape of the top surface 46 of the lid, although strict conformity of shape is not essential.

Using the FIG. 6 arrangement, the size of the plate 48 was varied in relation to the size of the surface 46 and the results plotted graphically (FIG. 5). In FIG. 5, the Y-axis represents the amount of microwave energy entering the container from the oven cavity, with an unmodified lid (i.e., no plate 48 present) shown as a datum. The X-axis represents the ratio of the area of surface 46 to that of plate 48. The size of plate 48 was reduced in steps by increasing the width of the microwave-transparent border area by equal amounts. When the size ratio is 100%, the energy entering the container is substantially zero because energy can only enter via the skirt 44 and is greatly limited. As the size of area 48 is reduced, a high peak is produced at a particular size, which is the size at which the heating effect of the fundamental modes of the container superimposes most favorably on that of the plate 48. Note that the heating effect of this is still very akin to that of the container above, only stronger, because of the superposition of the fundamental mode of the plate—there is still a significant cool area in the center.

As the size of plate 48 is reduced further, the effect of the higher order mode generated by the plate becomes more distinct form that of the container fundamental and thus more significant. The most favorable area is reckoned to be a ratio of between 40% and 20%. Below 20% the order of the mode generated by the plate becomes high and the wave transmitted from the plate is, as explained above, attenuated so quickly in the vertical direction as to have little effect on the overall heating characteristic, which thus returns to being that of the fundamental mode within the container.

In fact, at most sizes, the plate 48 of the FIG. 6 embodiment operates by a different mechanism to that of each of the areas, be they plates or apertures, in the embodiments of FIGS. 1 to 4. Instead of generating or amplifying a higher order mode which the container would naturally possess due to the boundary conditions set by its physical characteristics, as in the embodiments of FIGS. 1 to 4, the plate 48 of FIG. 6 "forces" into the container a mode in which the container, due to its physical characteristics, would not normally operate. The mode in this case is dictated by the size and shape of the plate 48 which in essence sets up its own fundamental mode within the container.

Of course, a fundamental mode of the plate 48 is necessarily of a higher order than the fundamental modes of the container itself, because the plate 48 is physically smaller than the container. This fundamental mode (of the plate 48) propagates into the interior of the container and has a heating effect on the adjacent food. Note that the central location of the plate 48 causes this heating effect to be applied to that part of the container which, when operating simply in the fundamental modes of the container, would be a cool area. Thus, in this case, the object is not, as in FIGS. 1 to 4, to accentuate the higher modes at the expense of the fundamental of the container, but rather to give a uniform heating by utilizing the aforementioned fundamental mode of the plate 48 in conjunction with the fundamental modes of the container. No attempt is made to generate or amplify naturally higher order modes of the container. However, it is likely that in some circumstances both mechanisms will operate together to provide an even distribution of microwave power within the container.

At one particular size of plate 48, the mechanism which utilizes amplification of naturally higher order modes of the container becomes predominant. If we notionally divide the rectangular top surface 46 into a 3×3 array of equal size and shape (as far as is possible) rectangles, then a plate 48 positioned over the central one of these, having an area of approximately one ninth of the area of surface 46 will have a size and shape such that it will generate a third order mode ($E_{33}$) with respect to the fundamental of the container. This is a mode which may well be naturally present within the container, but at a very low power level. The power distribution pattern of the mode in the horizontal plane comprises a series of nine roughly rectangular areas corresponding to each of the nine areas notionally mapped out above. The presence of a single plate 48 of a size and shape corresponding to the central one of these areas will encourage the presence of this natural higher order mode within the container and will indeed give a very even distribution of heating. A further (and better) method of generating this same mode is described below.

Figure 7:
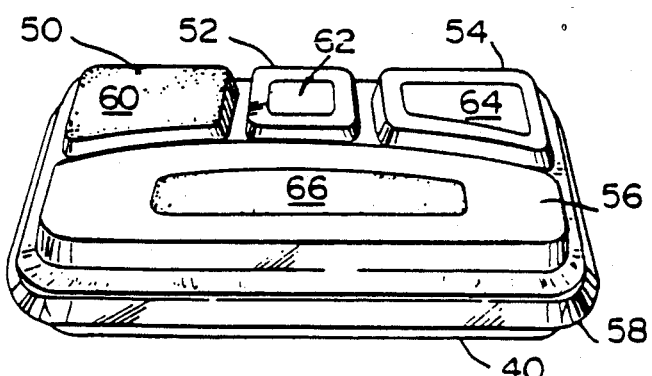

FIG. 7 shows a multi-compartment container 40 in which each compartment is treated separately. The container has a series of metallic walls (not shown) which form compartments directly under regions 50, 52, 54 and 56 in a lid 58. The lid is made of a microwave dielectric material and is basically transparent to microwave energy. Each compartment has a corresponding top surface area in lid 58 and each top surface area has an approximately conformal plate of metallic foil. Such conformal plates are shown in FIG. 7 at 60, 62, 64 and 66. The area of each conformal plate is dimensioned so as to provide the proper cooking energy and distribution to the foodstuff located in the compartment in question. For example, conformal plate 60 is large with respect to this compartment and shields the foodstuff located in region 50. The foodstuff in that compartment does not need much heating, and distribution is not a consideration. On the other hand, the foodstuff in region 56 requires an even distribution of heating and so conformal plate 66 is appropriately dimensioned.

Figure 8:
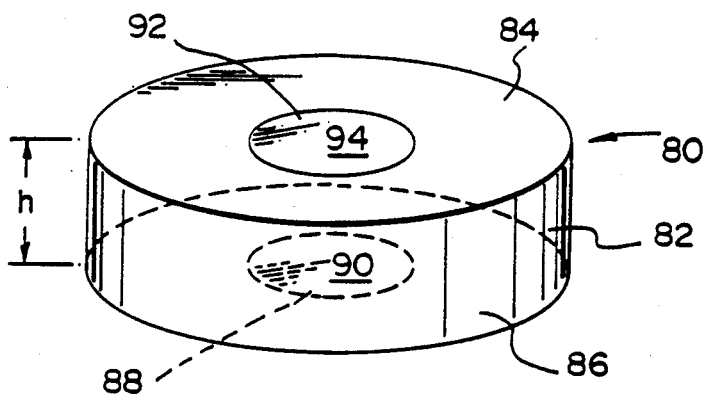

Referring to FIG. 8, there is shown a can-type cylindrical container 80 which has metallic side walls 82 and a metallic lid 84 and a metallic bottom 86. The container can be made from any metallic material such as aluminum or steel.

Circular aperture 88, which is coaxial with the circular bottom 86, is centrally located in bottom 86. The aperture 88 is covered with a microwave-transparent material 90. A similar aperture 92 and microwave-transparent covering 94 is located on the lid 84. The apertures 88 and 92 will be seen to act as windows to a particular higher mode of microwave energy, the order of this particular mode being dictated by the diameter of the apertures. Because the apertures are located top and bottom, the vertical heat distribution is improved, as explained above. The vertical height "h" of the container can be large and still result in good heating of the foodstuff. Here again, the diameter of each of the apertures in relation to that of the adjacent top or bottom surface dictates the mechanism of operation—i.e., whether natural container modes are generated or enhanced, or whether a "forced" mode, dictated solely by the characteristics of the aperture 88 or 92, is forced into the container to heat, in conjunction with the heating effect of the container fundamental.

Figure 9:
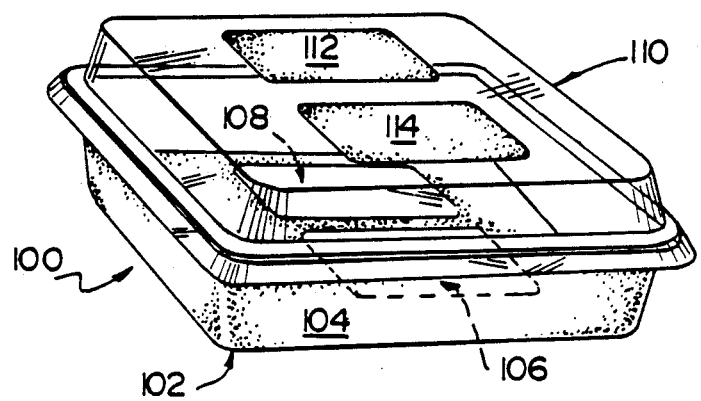

FIG. 9 is a further embodiment in which higher mode generating sources are located both in the lid and in the bottom of the container for better vertical heat distribution. The container consists of a metal foil tray 100 having a bottom 102 and sides 104. Bottom 102 includes two rectangular apertures 106 and 108. The container also includes a microwave-transparent lid 110 which has two metallic plates 112 and 114 located thereon. The plates 112 and 114 are located in registry with appertures 108 and 106, respectively. This embodiment operates essentially in the same manner as FIGS. 3 and 4 above and further explanation is thus omitted.

Figure 10A:
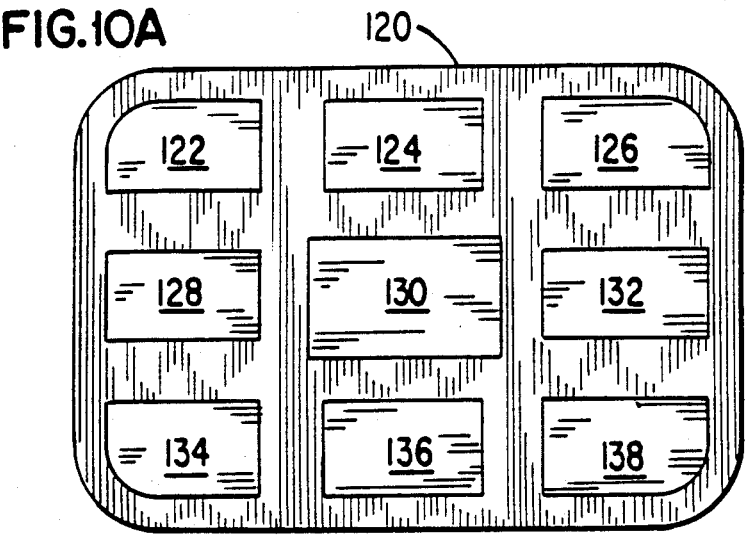
Figure 10B:
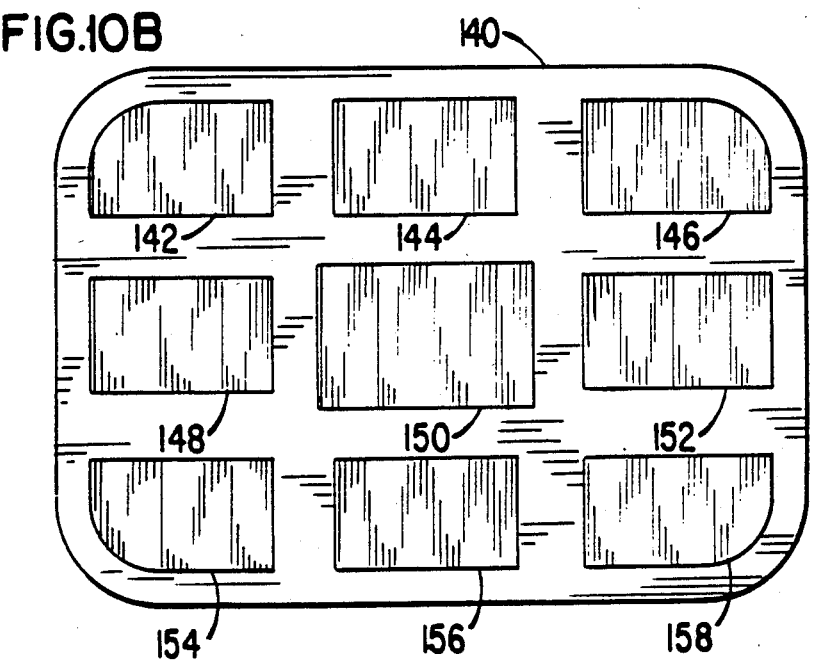

FIGS. 10A and 10B are plan views of, respectively, the container bottom 120 and lid 140 of a further embodiment. From the microwave point of view, it will be understood that the lid and bottom could in fact be interchanged as between FIGS. 10A and 10B.

In FIG. 10A, the bottom is shown as being primarily metallic which is obviously convenient if the rest of the container tray is metallic. The bottom is formed with a 3×3 array of nine apertures 122 to 138, each of which is covered with microwave transparent material. The lid 140 is primarily of microwave transparent material and is formed on its surface with a 3×3 array of nine plates 142 to 158 of conductive material such as metal. It will be seen from the pattern of plates/apertures in this embodiment that the mechanism of operation is by way of amplification of the third order ($E_{33}$) mode. In fact, presence of any one or more of the nine plates/apertures in the appropriate position will enhance the mode, as has already been seen above in the discussion of a single centrally-located plate, but the presence of all nine plates will provide still greater enhancement of this mode and thus particularly even heating. FIGS. 10A and 10B also illustrate the "tailoring" of the plate sizes to improve heat input to particularly cold areas: in this invention it will be noted that the size of the central aperture 130/plate 150 is slightly greater than that of the remainder. The reason for this is to cause the central plate aperture, overlying the coldest central area of the container, to operate not only to encourage amplification of the third order mode of the container, but also to act by the "forcing" mechanism by imposing its own field pattern on the central area. Such tailoring and shaping of particular areas is particularly useful for irregularly shaped containers or, as here, to enhance the heat input to particularly cold areas.

Typical dimensions for the embodiment of FIG. 10 are as follows:

| | |
|---|---|
| container overall width | 115 mm |
| container overall length | 155 mm |
| container overall depth | 30 mm |
| length of central aperture 130/plate 150 | 41 mm |
| width of central aperture 130/plate 150 | 27 mm |
| length of remaining apertures/plates | 35 mm |
| width of remaining apertures/plates | 22 mm |

The distance between adjacent apertures/plates is 12 mm, except for the central aperture/plate which is 9 mm.

While FIGS. 10A and 10B have been described as showing, respectively, a container bottom and lid for use together, it will be appreciated that either could be used alone. Thus, for example, the lid 140 of FIG. 10B could be used with a metallic container wherein the bottom has no apertures, or with a container of a dielectric plastic material.

In the case of the apertured bottom 10B, since the apertures are closely proximate to the contained food article, the aperture dimensions are not such as to cut off the propagation of the modes so formed, but this array of apertures could not be effectively used in a lid if there is substantial spacing between the apertures and the contained foodstuff.

Various other shapes of metal plate can be used to generate higher modes. For example, a ring-shaped plate of metal on a microwave transparent surface will result in the generation of two higher-order modes, one due to the exterior perimeter of the plate, and one still higher mode due to the interior perimeter of the plate. It is even possible to conceive of a whole series of coaxial rings each one smaller than the last, and each generating two modes. Such ring-shaped plates could be circular, or could be rectangular or square. Other shape and configurations of plate/aperture will be apparent to those skilled in the art.

In further exemplification of certain preferred features, stated with reference to arrangements of plates and/or apertures on the top and/or bottom surfaces of a container, it may be observed that advantageously superior results (in terms of effectiveness of localized heating produced by generation of a mode or modes of higher order than the container fundamental modes) may be attained by observance of one or more of the following preferred criteria, i.e. in addition to the spacing minima and avoidance of one-dimensional resonance discussed above:

1. The plates and/or apertuers should preferably be regular geometric figures within a coordinate system defined by the container geometry. For example, in the case of a container with a periphery of rectangular shape in plan projection, the defined coordinate system is a Cartesian coordinate system, and the plate(s) or aperture(s) should preferably be at least approximately rectangular in shape, with sides parallel to the axes of that coordinate system (viz., the geometric axes of the plan projection of the container); in the case of a container with a periphery of circular shape in plan projection, the defined coordinate system is cylindrical, and the plates or apertures should preferably (a) coincide approximately with sectors therein or (b) should have circular boundaries concentric with but differing in radius from the plan projection of the container periphery.

2. If only one plate or aperture is used, it should preferably be centered with respect to the container periphery as viewed in plan projection, and should preferably be at least approximately conformal in shape to the plan projection of the container periphery (circular, for a circular container periphery; rectangular, for a rectangular container periphery, with the same aspect ratio and orientation as the container periphery; elliptical, for an elliptical container periphery, with foci coincident with those of the container periphery, or with the same aspect ratio as the container periphery).

3. For enhancement of "naturally existing" modes in a container, the plates and/or apertures should preferably be at least approximately in register with "cells" corresponding to a selected higher-order mode which is a harmonic of the fundamental modes defined by the container geometry. By way of example, in FIG. 10B, the $E_{33}$ mode is a harmonic of the fundamental modes in the illustrated rectangular container and the nine plates shown are respectively positioned for register with the nine cells corresponding to this mode. In the case of a container of circular periphery with its cylindrical coordinate system, the angularly harmonic mode cells will be sectors of the container periphery circle (as exemplified by the arrangements of FIGS. 1 and 2) and the radially harmonic mode cells will be regions bounded by circles concentric with the container periphery (exemplified by FIG. 8, or by an arrangement of concentric annular plates or apertures).

4. For "forced mode" operation, the plate(s) and/or aperture(s) should still preferably conform in shape to the container coordinate system (circular or sectoral, for a circular container; rectangular, for a rectangular container) though they may be nonproportional to the container outline and in register with a "cell" which is not an element of a harmonic mode of the container fundamental. Thus, a centered rectangular plate for "mode forcing" in a rectangular container may correspond in shape to a central "cold" area (i.e. an area not effectively directly heated by microwave energy in the container fundamental modes) which is not proportional in dimensions with the container periphery or coincident with a cell corresponding to a harmonic of the container fundamental modes.

5. The sides of the plates should preferably not meet at acute angles, to avoid arcing, although if it is necessary that sides of a plate converge at an acute angle (e.g. as in the case of plate 64 in FIG. 7) the apex should be radiused. Also, preferably, when plural plates having right-angled corners are fairly closely spaced (as in FIG. 10B), it is preferred for the same reason that their corners be radiused; in the example of dimensions given for the embodiment of FIG. 10B, a corner radius of 2 to 3 mm. is convenient or preferred.

II. THE PRESENT INVENTION

In the specific embodiments now to be described, the containers of the present invention are generally of the types shown in FIGS. 1-4 and 6-10B, but in place of lids or other surfaces constituted of microwave-transparent sheets bearing metal plates or metal sheets defining apertures covered with microwave-transparent sheet material, there are provided dielectric lid or other wall structures having contiguous dielectric wall portions of respectively different electrical thicknesses. More particularly, in accordance with the invention, the metal plates or sheets in the lids of the containers of FIGS. 1-4 and 6-10B are replaced with similarly configured dielectric wall portions of electrical thickness substantially greater than that of the microwave-transparent dielectric sheet material extending over the apertures or around and/or between the plates. Similarly, where combinations of metal plates or aperture-defining metal sheets and microwave-transparent material are provided in the base or bottom of these containers, the same substitution is made.

Thus, referring to FIGS. 1-4, if the elements or regions 12, 16, 20 and 26 are considered to be constituted of dielectric wall portions of relatively high electrical thickness, in the lids 8 therein shown, while the regions 14, 18, 22 and 28 are constituted of dielectric wall portions of relatively low electrical thickness (such as the microwave-transparent dielectric sheet materials already described as used for these latter regions), containers 8 having such lids or bottoms 10 represent embodiments of the present invention, provided that the difference in electrical thickness between the contiguous wall portions (12 and 14, or 16 and 18, or 20 and 22, or 26 and 28), and the electrical thicknesses of the portions 12, 16, 20 and 26, are suffiently large to effect modification of the microwave electric field patterns (i.e. to generate higher order modes) within the container.

Similarly, in a container as shown in FIG. 6, in accordance with the present invention the region 48 is a dielectric wall portion of relatively high electrical thickness and the surrounding part of lid surface 46 is constituted by a dielectric wall portion of relatively low electrical thickness. In like manner the remaining containers illustrated in FIGS. 7-10B may be regarded as embodiments of the present invention if the regions identified in the above description of these figures as metal plates or aperture-defining metal sheets are deemed to be constituted instead of dielectric wall portions of electrical thickness substantially greater than that of the microwave-transparent dielectric material of the regions which surround, or are surrounded by them.

Also, referring particularly to FIGS. 8-10B, wherein plates and/or apertures are shown in both the lid and bottom of the container, either the lid or bottom may be a dielectric wall structure in accordance with the present invention (i.e., constituted of contiguous dielectric wall portions of respectively greater and lesser electrical thickness) and the other cooperating higher-mode-generating means (bottom or lid) may utilize metal plates or aperture-defining metal sheets as set forth in the initial description of these features above.

Figure 11:
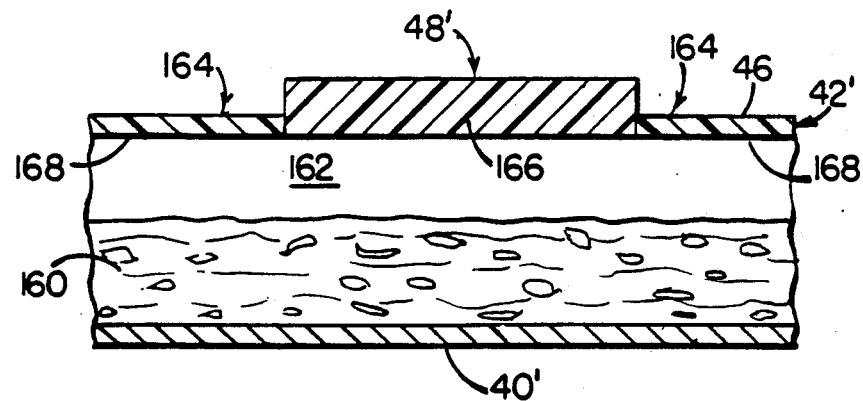
FIG. 11 is an enlarged fragmentary sectional elevational view of a microwave heating container embodying the present invention in a particular form, taken as along the line 11—11 of FIG. 6.

A more specific illustration of an embodiment of the present invention, generally corresponding in arrangement to the container of FIG. 6, is shown in FIG. 11. Metal foil tray 40' in FIG. 11 contains a body of foodstuff 160 to be heated, and is covered by a lid 42' of dielectric material which is spaced by a gap 162 above the upper surface of the foodstuff body. The upper surface 46' of this lid is divided into a centrally disposed region 48' and a second region 164 contiguous to and completely laterally surrounding region 48', i.e., in the same manner that region 48 of FIG. 6 is surrounded by the remaining area of surface 46. The region 48' is defined by a first dielectric wall portion 166, while the region 164 is defined by a second dielectric wall portion 168 contiguous to and completely laterally surrounding portion 166. The wall portion 166 has a substantially greater dielectric thickness than the wall portion 168.

Figure 12:
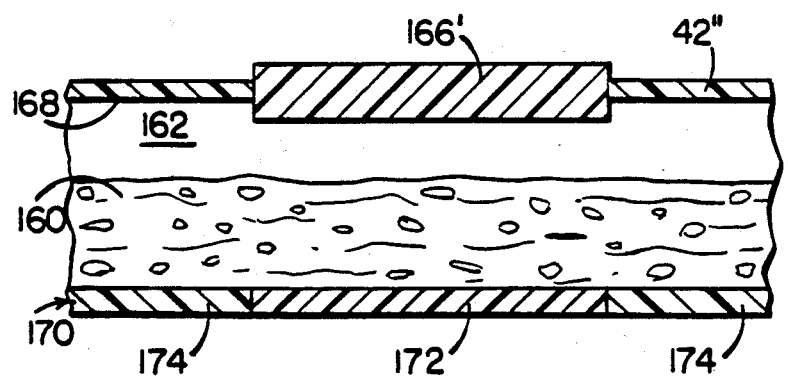
FIG. 12 is a view, similar to FIG. 11, of another embodiment of the invention.

A modification of this structure is shown in FIG. 12, wherein like reference numerals designate like parts. The lid 42" is similar to lid 42' but has a central wall portion 166' of relatively high electrical thickness that is somewhat differently positioned, in a vertical sense, relative to the surrounding low-electrical-thickness wall portion 168. Also, in this embodiment the foil tray 40' is replaced by a tray 170 of dielectric material, having a bottom wall structure constituted of a central dielectric wall portion 172 (in register with wall portion 166', and conforming thereto in plan outline) completely laterally surrounded by a contiguous dielectric wall portion 174. In this tray, the surrounding wall portion 174 has a substantially greater electrical thickness than the central wall portion 172.

It is found that containers incorporating the described dielectric lid and/or other dielectric wall structure in accordance with the present invention function, like the containers described in the aforementioned copending application, to modify microwave electric field patterns within the container, i.e. when the container, holding a body of material to be heated, is placed in a microwave oven and irradiated with microwave energy. Specifically, these dielectric wall structures comprising appropriately arranged contiguous wall portions of respectively different electrical thicknesses generate modes of a higher order than the fundamental modes of the container, and the higher order mode or modes so generated propagate into the body of material to thereby locally heat the material. In this way, desired heating distributions may be achieved in the body.

Referring again particularly to FIGS. 11 and 12, as exemplifying the structures of the invention, the dielectric wall portions 168 and 172 which have relatively low electrical thickness may, like the microwave-transparent sheets in the structures of the aforementioned copending application, be fabricated of conventional electrically nonconductive container lid or packaging materials such as paperboard or plastic. Typically, such materials have a dielectric constant less than 10, e.g. a dielectric constant in a range of about 3 to about 7.

Preferably, the dielectric wall portions 166, 166' and 174, which have relatively high electrical thicknesses, are so constituted that their dielectric constants are substantially greater than the dielectric constant of the low-electrical-thickness material just described. A useful exemplary (but nonlimiting) range for the dielectric constant of the higher-electrical-thickness wall portions is about 25 to 30, where the dielectric constant of the low-electrical-thickness wall portions is below 10. The portions 166, 166' and 174 of greater electrical thickness may also have a spatial (physical) thickness greater than the wall portions of low electrical thickness; this is true of portions 166 and 166' in FIGS. 11 and 12, which exemplify two of the possible relative vertical dispositions of the thicker and thinner wall portions in a dielectric wall structure extending substantially horizontally. However, since the dielectric constant as well as the physical thickness contributes to electrical thickness, the wall portions of greater electrical thickness need not be physically thicker than the portion or portions of lesser electrical thickness, provided that there is a sufficient difference in dielectric constant, as exemplified by the bottom wall structure constituted of portions 172 and 174 in FIG. 12.

The material of the electrically thicker dielectric wall portions 166, 166' and 174 may be homogeneous dielectric material with an appropriately high dielectric constant. Alternatively, it may be a so-called artificial dielectric, such as a dispersion of metal particles in a plastic or other dielectric matrix, wherein the metal particles serve to enhance significantly the effective dielectric constant of the material; such artificial dielectrics are known in the art and accordingly need not be further particularized.

Very advantageously, the dielectric wall portion or portions of greater electrical thickness (166, 166' and 174 in FIGS. 11 and 12), or some of them, may be more or less lossy in character, at least initially (i.e., absorptive of microwave energy, and heatable thereby), and may further be so constituted as to undergo a gradual or abrupt decrease in dielectric constant during the course of a microwave heating operation. In a container according to the invention incorporating one or more dielectric wall portions of this character, the change in dielectric constant that occurs in the latter portion or portions during heating in a microwave oven reduces or substantially eliminates the higher-mode-generating differences in electrical thickness between contiguous dielectric wall portions. As a result, the effect of the dielectric wall structure in modifying the field pattern within the container is self-limiting. This enables the distribution of heating in the contained body of material to be altered, at an intermediate stage of the microwave heating operation, as is frequently desirable for particular cooking or other heating purposes.

In a broad sense, any dielectric body (e.g., having the shape of wall portion 166 in FIG. 11) which initially has a relatively high dielectric constant (e.g., above 20), which is initially lossy in character and which through physical and/or chemical changes in response to heating undergoes an abrupt or progressive decrease in dielectric constant, is suitable for use in these embodiments of the invention. For instance, the wall portion 166 may be formed of a porous plastic material that absorbs water, and may initially be provided with a relatively high moisture content, which imparts to the portion 166 a relatively high dielectric constant. When the container of FIG. 11, having wall portion 166 thus constituted, is placed in a microwave oven and irradiated, the water in portion 166 absorbs and is heated by the irradiated microwave energy, and is thereby progressively volatilized. As the water is driven off, reducing the moisture content of the portion 166, the dielectric constant of this portion decreases, and its electrical thickness approaches that of the surrounding portion 168 of initial low (and unchanging) electrical thickness. Hence the initial higher-mode-generating effect of the lid structure is effectively shut off, at an intermediate stage during the continued heating of the contained body 160 in a microwave oven, and the initial heating pattern in the contained body of foodstuff 160 is concomitantly altered without operator intervention, while cooking continues uninterrupted.

As alternatives to porous plastic, instead of being formed of a porous plastic material, the body portion 166 may comprise a silica gel or other gel structure, or a plastic with glycol or material to hold water, such that again, upon heating, an initially high water content is reduced progressively by volatilization with resultant decrease in dielectric constant. As a further alternative, the portion 166 may be formed of a hygroscopic material, initially substantially dry (e.g., if the container of FIG. 11 is a frozen food package, stored in a freezer); this material, when exposed to ambient temperatures before heating, takes up atmospheric moisture sufficient to initially elevate its dielectric constant and to achieve the requisite decrease in water content upon heating.

As another illustration of an initially high-electrical-thickness, variable dielectric wall portion 166, such portion may incorporate a suitable ferro-electric material having a dielectric constant which is high (e.g. 150) at ambient temperature but drops to a low value (e.g., 7 or 8) upon heating of the ferro-electric to its Curie temperature. Some ferro-electrics, such as titanites based on heavy metals, may present toxicity problems precluding their use in or on food containers, though they would be suitable for use in accordance with the invention to heat bodies of material not intended for human consumption. Other ferro-electrics, such as Rochelle salts, are acceptable for the described use in food packaging.

By way of further illustration of the invention, reference may be made to the following specific example:

EXAMPLE

A microwave cooking container (circular in plan view) for a pot pie of 5-inch nominal diameter, with a plastic lid having a nominal height of ½ inch, is provided (in accordance with the aforementioned copending application) with an aluminum foil disc of 5.5 cm diameter centrally mounted on the lid. This arrangement has been found highly effective for browning and cooking a pot pie.

In accordance with the present invention, in a pot pie container as just described, the metal foil disc was replaced with a "Polyfoam" porous plastic disc 0.24 inch thick and 5.5 cm. in diameter, mounted on the lid in the same centered location. The "Polyfoam" disc was used as a matrix to hold water. A plurality of such containers were prepared, and the "Polyfoam" discs were loaded with water. Initial microwave heating tests demonstrated that for discs with an initial moisture content corresponding to an initial estimated dielectric constant at or below 30, evaporation losses of water would decrease the dielectric constant to less than 10 over reasonable heating times.

When used to cook pastry, these containers having lids with water-loaded "Polyfoam" discs not only improved heating distribution but also browned the pastry as effectively as containers with lids having the aforementioned foil discs. Results, for containers having "Polyfoam" discs with various different initial moisture contents (and, consequently, various different initial estimated dielectric constants) are summarized below:

| Est. Dielectric Constant | Observations |
| --- | --- |
| 20 | Similar to unmodified container, center of fill cool, central pastry uncooked. |
| 25 | Better center fill temperatures, central pastry cooked but not browned. |
| 30 | Excellent fill temperatures, excellent browning, particularly at center. |
| 35 | Center temperatures greater than at periphery, pastry overcooked at center. |

It is to be understood that the invention is not limited to the features and embodiments hereinabove specifically set forth, but may be carried out in other ways without departure from its spirit.

I claim:

1. A package of material to be heated in a microwave oven, comprising a container and a body of material to be heated disposed in the container, said container comprising an open-topped tray carrying the body of material and a lid covering the tray to form a cavity, the container and the body defining fundamental modes of microwave energy in said cavity, at least one extended surface of the container being provided with mode generating means for generating, within the cavity, at least one microwave energy mode of a higher order than that of said fundamental modes, the mode-generating means being dimensioned and positioned with respect to the body of material in the container for causing microwave energy in said at least one higher-order mode to propagate into the body of material thereby to locally heat the body of material, wherein the mode generating means comprises at least a first dielectric wall portion of the container defining a first region of the extended surface and a second dielectric wall portion of the container defining a second region of the extended surface contiguously surrounding the first region, one of these two wall portions having an electrical thickness substantially greater than that of the other.

2. A package as defined in claim 1, wherein the variation of electrical thickness between said first and second wall portions is gradual.

3. A package as defined in claim 1, wherein said first portion has a greater electrical thickness than said second portion.

4. A package as defined in claim 1, wherein said second portion has a greater electric thickness than said first portion.

5. A package as defined in claim 1, wherein said one dielectric wall portion of greater electrical thickness comprises material having a higher dielectric constant than the material of the dielectric wall portion of lesser electrical thickness.

6. A package as defined in claim 5, wherein said one portion of greater electrical thickness has a greater spatial thickness than said portion of lesser electrical thickness.

7. A package as defined in claim 5, wherein said one portion of greater electrical thickness comprises an artificial dielectric material.

8. A package as defined in claim 7, wherein said artificial dielectric material comprises a dispersion of metallic particles in a nonconductive matrix and is characterized by a dielectric constant higher than that of the matrix material alone.

9. A package as defined in claim 1, wherein at least one of said dielectric wall portions is so constituted as to undergo a change in dielectric constant when subjected to irradiation by microwave energy.

10. A package as defined in claim 9, wherein the last-mentioned dielectric wall portion is said portion of greater electrical thickness and is initially lossy and is so constituted as to undergo a decrease in dielectric constant when heated.

11. A package as defined in claim 10, wherein said decrease is progressive.

12. A package as defined in claim 11, wherein said dielectric wall portion of greater electrical thickness comprises a material having an initially high moisture content, which volatilizes as heating proceeds, progressively reducing the dielectric constant of said last-mentioned wall portion.

13. A package as defined in claim 12, wherein the last-mentioned wall portion comprises a hygroscopic material which takes up moisture when exposed to air at ambient temperatures.

14. A package as defined in claim 10, wherein said decrease occurs upon attainment of a predetermined elevated temperature.

15. A package as defined in claim 14, wherein said dielectric wall portion of greater electrical thickness comprising a ferroelectric substance having a high ambient-temperature dielectric constant but undergoing a marked drop in dielectric constant when its Curie temperature is reached.

16. A package as defined in claim 1, wherein said first and second dielectric wall portions are in said lid.

17. A package as defined in claim 16, wherein said tray includes a bottom having a higher-mode-generating structure for cooperating with said dielectric wall portions in the lid for modifying the microwave electric field pattern within the container.

18. A package as defined in claim 1, wherein said first and second wall portions of respectively greater and lesser electrical thickness are demarcated by an abrupt discontinuity in dielectric thickness between them.

* * * * *